United States Patent
Park et al.

(10) Patent No.: US 8,958,520 B2
(45) Date of Patent: Feb. 17, 2015

(54) TOP NOZZLE FOR NUCLEAR FUEL ASSEMBLY HAVING SPRING INSERT HOLE IMPROVED IN FASTENING STABILITY AND METHOD OF MANUFACTURING THE SAME

(75) Inventors: Joon Kyoo Park, Daejon (KR); Jin Seok Lee, Daejon (KR); Kyeong Lak Jeon, Daejon (KR); Jung Min Suh, Daejon (KR); Gi-Jun Gwon, Daejon (KR); Nam Gyu Park, Daejon (KR); Kyong Bo Eom, Daejon (KR); Jin Sun Kim, Daejon (KR); Dong Geun Ha, Daejon (KR); Kyoung Joo Kim, Daejon (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 0 days.

(21) Appl. No.: 13/524,254

(22) Filed: Jun. 15, 2012

(65) Prior Publication Data

US 2012/0246933 A1  Oct. 4, 2012

Related U.S. Application Data

(62) Division of application No. 12/748,367, filed on Mar. 26, 2010.

(30) Foreign Application Priority Data

Jan. 25, 2010  (KR) .......................... 10-2010-0006469

(51) Int. Cl.
*G21C 21/00* (2006.01)
*G21C 21/16* (2006.01)
*G21C 3/33* (2006.01)

(52) U.S. Cl.
CPC .............. *G21C 3/331* (2013.01); *G21C 3/3315* (2013.01); *G21C 21/00* (2013.01); *Y02E 30/40* (2013.01)
USPC .......................................... 376/261; 376/446

(58) Field of Classification Search
USPC ................ 403/360, 379.3, 381; 376/261, 446
See application file for complete search history.

(56) References Cited

U.S. PATENT DOCUMENTS

| | | | | |
|---|---|---|---|---|
| 4,707,328 | A | * | 11/1987 | Arbink et al. .................. 376/446 |
| 4,938,919 | A | * | 7/1990 | Rylatt .............................. 376/446 |
| 5,213,757 | A | * | 5/1993 | Ohman .......................... 376/261 |
| 2009/0257545 | A1 | * | 10/2009 | Savinell et al. ................. 376/261 |

FOREIGN PATENT DOCUMENTS

KR  10-1999-0046308 A  7/1999

* cited by examiner

*Primary Examiner* — Jack W Keith
*Assistant Examiner* — Sean P Burke
(74) *Attorney, Agent, or Firm* — Rabin & Berdo, P.C.

(57) ABSTRACT

A top nozzle is provided. The top nozzle can include a coupling plate, a perimeter wall and a hold-down spring unit. The coupling plate can be coupled to a guide thimble of the nuclear fuel assembly. The perimeter wall can protrude upwards from the perimeter of the coupling plate. A spring clamp can be provided on the upper surface of the perimeter wall. The hold-down spring unit can be mounted to the upper surface of the perimeter wall in such a way to couple a corresponding end of the hold-down spring unit to the spring clamp. A fastening pin hole can be vertically formed through an upper surface of the spring clamp. A spring insert hole into which the hold-down spring unit can be inserted and formed by electro-discharge machining in an insert direction of the hold-down spring.

2 Claims, 9 Drawing Sheets

TOP NOZZLE FOR NUCLEAR FUEL ASSEMBLY HAVING SPRING INSERT HOLE IMPROVED IN FASTENING STABILITY AND METHOD OF MANUFACTURING THE SAME

CROSS REFERENCE TO RELATED APPLICATIONS

This application is a divisional application of co-pending U.S. application Ser. No. 12/748,367, filed Mar. 26, 2010, the disclosure of which is incorporated herein by reference. This application claims priority benefits under 35 U.S.C. §1.119 to Korean Patent Application No. 10-2010-0006469 filed Jan. 25, 2010.

BACKGROUND OF THE INVENTION

1. Field of the Invention

The present invention relates to a top nozzle for a nuclear fuel assembly having a spring insert hole.

2. Description of the Related Art

As is well known to those skilled in the art, a nuclear reactor is a device in which a fission chain reaction of fissionable materials is controlled for the purpose of generating heat, producing radioactive isotopes and plutonium, or forming a radiation field.

Generally, in light-water reactor nuclear power plants, enriched uranium, which is increased in the ratio of uranium-235 to 2% through 5%, is used. To process enriched uranium into nuclear fuel to be used in nuclear reactors, a forming process, by which uranium is formed into a cylindrical pellet having a weight of about 5 g, is conducted. Several hundreds of pellets are retained into a bundle and inserted into a zirconium tube under vacuum conditions. A spring and helium gas are supplied into the tube and a cover is welded and sealed onto the tube, thus completing a fuel rod. A plurality of fuel rods constitutes a nuclear fuel assembly and is burned in a nuclear reactor by nuclear reaction.

FIG. 1 is a front view showing a typical nuclear fuel assembly. FIG. 2 is a perspective view of a top nozzle 30 provided with spring clamps 31 having spring insert holes 31a formed by milling, according to a conventional technique (U.S. Pat. No. 5,213,757).

As shown in FIG. 1, the nuclear fuel assembly includes a plurality of support grids 10 through which fuel rods (not shown) are inserted, and a plurality of guide thimbles 20 which are coupled to the support grids 10. The nuclear fuel assembly further includes a top nozzle 30 which is coupled to the upper ends of the guide thimbles 20, a bottom nozzle 16 which is coupled to the lower ends of the guide thimbles 20, and the fuel rods (not shown) which are supported by springs and dimples which are formed in the support grids 10.

As shown in FIG. 2, the top nozzle 30 includes fastening parts 15, spring clamps 31 and hold-down spring units 32. The fastening parts 15 function to couple the top nozzle 30 to alignment pins in an upper core plate. Each spring clamp 31 has the spring insert holes 31a formed therein. The end of each hold-down spring unit 32 is inserted into a corresponding spring insert hole 31a. Fastening pin holes 33' are formed through the upper surface of each spring clamp 31 above the corresponding spring insert holes 31a. T-slots 14 are formed in each spring clamp 31 and respectively communicate with the fastening pin holes 33'. The hold-down spring units 32 are inserted into the corresponding spring insert holes 31a and fastened to corresponding spring clamps 31. Each spring insert hole 31a is formed by milling in such a way to insert a milling tip (not shown) into the T-slot 14 formed in the upper surface of the spring clamp 31.

Each hold-down spring unit 32 includes a first spring 32a having a first neck part 32a', and a second spring 32b and a third spring 32c which are coupled to the first neck part 32a'. The hold-down spring unit 32 is configured such that the first, second and third springs 32a, 32b and 32c are stacked on top of one another. To couple the hold-down spring unit 32 to the top nozzle 30, a spring junction end of the hold-down spring unit 32, which is opposite to the first neck part 32a', is inserted into the corresponding spring insert hole 31a in a horizontal direction. Thereafter, a fastening pin 33 is inserted both into the corresponding fastening pin hole 33' of the spring clamp 31 and a fastening pin hole 32a'' of the hold-down spring unit 32 in the vertical direction. Thereby, the hold-down spring unit 32 is coupled to the top nozzle 30. Here, to prevent the fastening pin 33 from being removed, the upper end of the fastening pin 33 is fastened to the spring clamp 31 by spot welding. In FIG. 2, reference numeral 40 denotes an upper plate, and reference numeral 41 denotes an upper plate slot.

As shown in FIG. 1, the top nozzle 30 having the above-mentioned construction is assembled with the elements of the nuclear fuel assembly. Subsequently, as is well known, the nuclear fuel assembly is installed in a core and disposed between an upper core plate (not shown) and a lower core plate such that the hold-down spring units 32 are supported by the lower surface of the upper core plate. As such, the nuclear fuel assembly is installed in the core of the nuclear reactor in which nuclear fission is caused and is used as fuel for nuclear power generation.

When the nuclear fuel assembly, which is installed in the nuclear reactor, is used as nuclear fuel, the hold-down spring units 32 of the top nozzle 30 conduct a shock absorption function against vibrations generated by a hydraulic uplift force induced by the flow of coolant during the operation of the nuclear reactor, thermal expansion attributable to an increase in temperature, irradiation growth of the nuclear fuel tube due to neutron irradiation for a long period of time, or axial length variation owing to creep. Thereby, a mechanical-structural stability of the nuclear fuel assembly is ensured.

However, in the top nozzle 30 according to the conventional technique, when the uplift force is applied to the T-slot 14 provided for forming each spring insert hole 31a by the end of the hold-down spring unit 32 inserted into the spring insert hole 31a, the T-slot 14 widens, causing the hold-down spring unit 32 fastened to the spring clamp 31 to become loosened. Thereby, a force supporting the nuclear fuel assembly is markedly deteriorated.

Furthermore, in a case where the spring insert holes 31a are formed in the top nozzle 30 by milling in the direction in which the hold-down spring units 32 are inserted into the spring insert holes 31a without forming the T-slots 14, the milling operation is impeded by the fastening parts 15 which protrude from the upper surface of the top nozzle 30 at positions opposite to the spring clamps 31. Thus, it is very difficult to precisely machine each spring clamp 31 such that the interior of the spring insert hole 31a has a shape corresponding to the end of the hold-down spring unit 32.

Thereby, the end of the hold-down spring unit 32 cannot be brought into close contact with the inner surface of the spring insert hole 31a. As a result, the hold-down spring units 32 cannot reliably absorb vibrations of the nuclear fuel assembly when the unclear reactor is operated.

Moreover, in an extreme case, the above-mentioned problems in the conventional technique may cause a deformation or breakage of the nuclear fuel assembly.

SUMMARY OF THE INVENTION

Accordingly, the present invention has been made keeping in mind the above problems occurring in the prior art, and an object of the present invention is to provide a top nozzle for a nuclear fuel assembly in which a spring insert hole can be formed in a spring clamp without forming a T-slot, thus enhancing the structural stability of the spring clamp holding a hold-down spring unit.

Another object of the present invention is to provide a top nozzle for a nuclear fuel assembly in which the spring insert hole can be easily and precisely formed such that the end of the hold-down spring unit is brought into close contact with the inner surface of the spring insert hole, thus enhancing a manufacturing efficiency.

A further object of the present invention is to provide a method of manufacturing a top nozzle for a nuclear fuel assembly which makes precise machining possible, thus enhancing the structural stability of the spring clamp having the spring insert hole, thereby increasing the stability of the hold-down spring unit fastened to the spring clamp.

In order to accomplish the above mentioned objects, the present invention provides a top nozzle for a nuclear fuel assembly, including: a coupling plate coupled to a guide thimble of the nuclear fuel assembly; a perimeter wall protruding upwards from a perimeter of the coupling plate, with a spring clamp provided on an upper surface of the perimeter to wall; and a hold-down spring unit mounted to the upper surface of the perimeter wall in such a way as to couple a corresponding end of the hold-down spring unit to the spring clamp. A fastening pin hole is vertically formed through an upper surface of the spring clamp, and a spring insert hole is formed by electro-discharge machining in a insert direction of the hold-down spring so that the hold-down spring unit is coupled into the spring insert hole of the spring clamp.

Preferably, before the electro-discharge machining process is conducted, the coupling plate and the perimeter wall can be integrally formed by casting into a single body.

The fastening pin hole, which defines a part of the spring insert hole, can have an elliptical pin head seat formed in the upper surface of the clamp.

The spring insert hole can be formed by electro-discharge machining without having a T-slot.

The spring insert hole can be formed in such a way as to form a premachined hole having a cross-section less than a cross-section of the spring insert hole and conduct an electro-discharge machining process.

The top nozzle can further include a fastening pin provided with a head having a shape corresponding to the elliptical pin head seat, the fastening pin being inserted into the fastening pin hole to hold the hold-down spring unit.

In order to accomplish the above object, the present invention provides a method of manufacturing a top nozzle for a nuclear fuel assembly, including: forming a fastening pin hole in a vertical direction through an upper surface of a spring clamp provided on the top nozzle; forming a spring insert hole in a insert direction of the hold-down spring into which a hold-down spring unit is inserted using an electro-discharge machining process; and coupling the hold-down spring unit to the spring clamp in such a way as to insert an end of the hold-down spring unit into the spring insert hole.

The electro-discharge machining process can be conducted without forming a T-slot.

The forming of the fastening pin hole can include forming an elliptical pin head seat in such a way as to form an upper end of the fastening pin hole into an elliptical shape.

The forming of the spring insert hole through the electro-discharge machining process can include forming a premachined hole through the elliptical pin head seat before the electro-discharge machining process is conducted.

The method can further include casting a main body of the top nozzle before the forming of the fastening pin hole, the main body including a coupling plate coupled to a guide thimble of the nuclear fuel assembly, and a perimeter wall protruding upwards from a perimeter of the coupling plate, with the spring clamp provided on an upper surface of the perimeter wall.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 3:
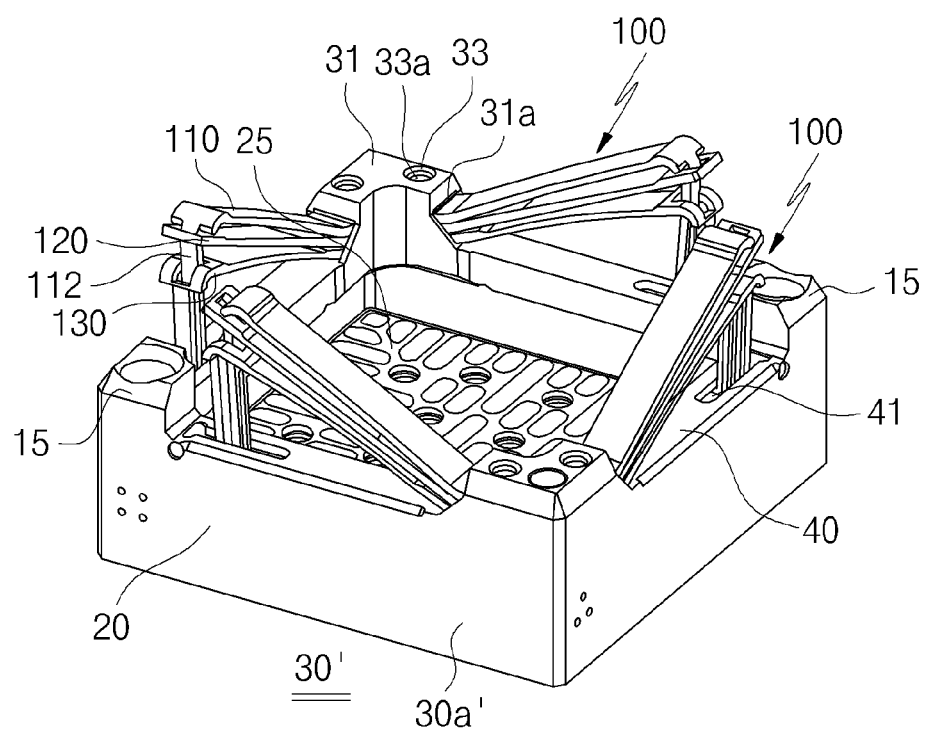
FIG. 3 is a perspective view of a top nozzle, according to an embodiment of the present invention.

FIG. 3 is a perspective view of a top nozzle 30', according to an embodiment of the present invention.

Figure 1:
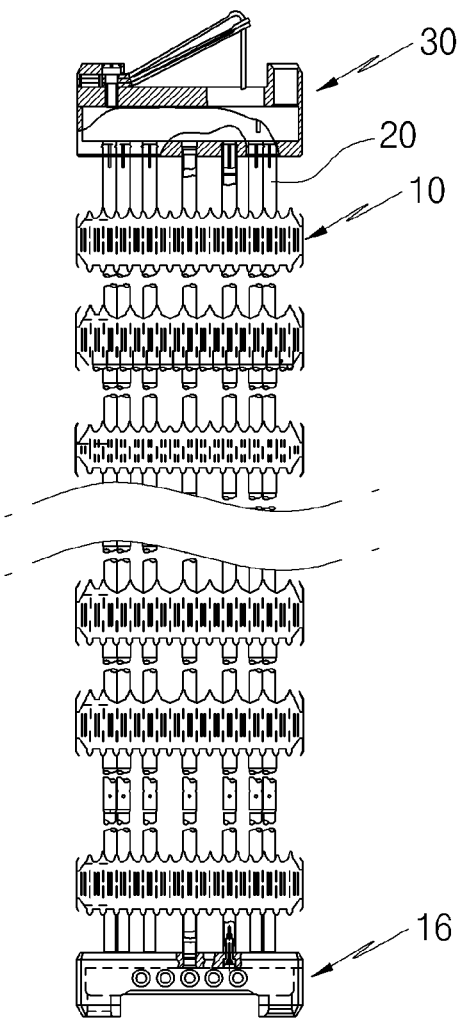
FIG. 1 is a front view showing a typical nuclear fuel assembly.
Figure 2:
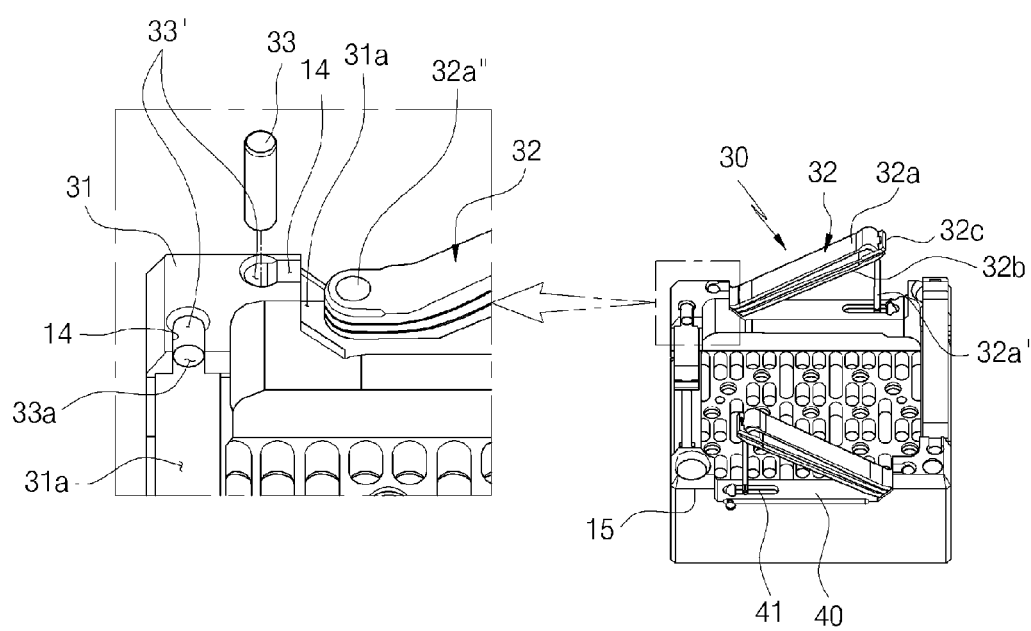
FIG. 2 is a perspective view of a top nozzle of a nuclear fuel assembly, according to a conventional technique.

As shown in FIG. 3, the top nozzle 30' can include a coupling plate 25, a perimeter wall 20 and a plurality of hold-down spring units 100. The coupling plate 25 is coupled to guide thimbles (not shown) of a nuclear fuel assembly. The perimeter wall 20 protrudes upwards from the perimeter of the coupling plate 25. Spring clamps 31 and fastening parts 15 are provided on the upper surface of the perimeter wall 20. Spring insert holes 31a are formed in each spring clamp 31. The hold-down spring units 100 are provided on the upper surface of the perimeter wall 20 and inserted into corresponding spring insert holes 31a of the spring clamps 31. In accordance with an embodiment of the present invention, the top nozzle 30' has no separate T-slots (refer to FIG. 2), unlike the conventional technique.

Figure 4:
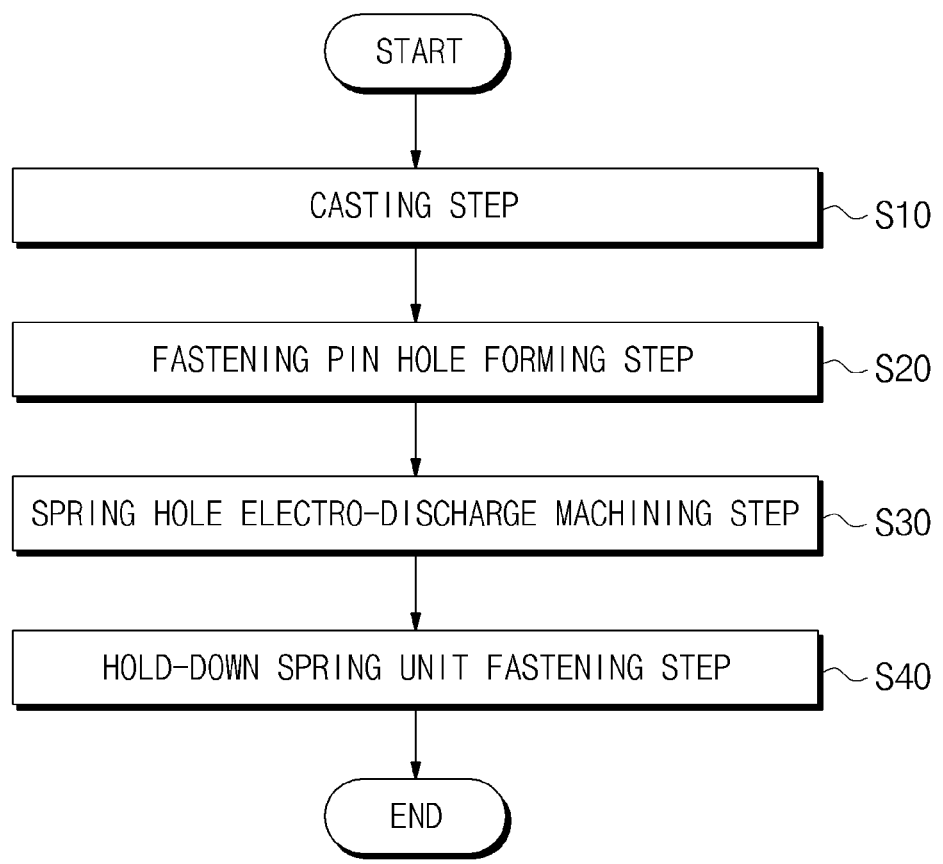
FIG. 4 is a flowchart of a method of manufacturing the top nozzle of FIG. 3.

Here, because the top nozzle 30' of the present invention is manufactured by the method of FIG. 4, the spring insert holes 31a can be formed without forming the T-slots 14.

Figure 5A:
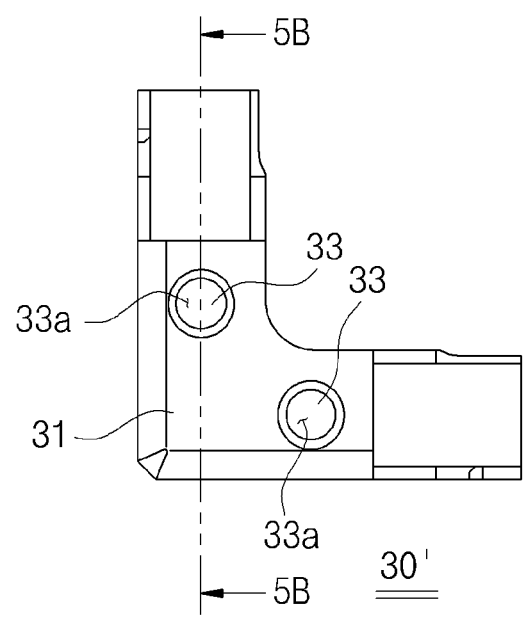
FIGS. 5A and 5B are views showing circular fastening pin holes formed in a spring clamp of the top nozzle of FIG. 3.
Figure 5B:
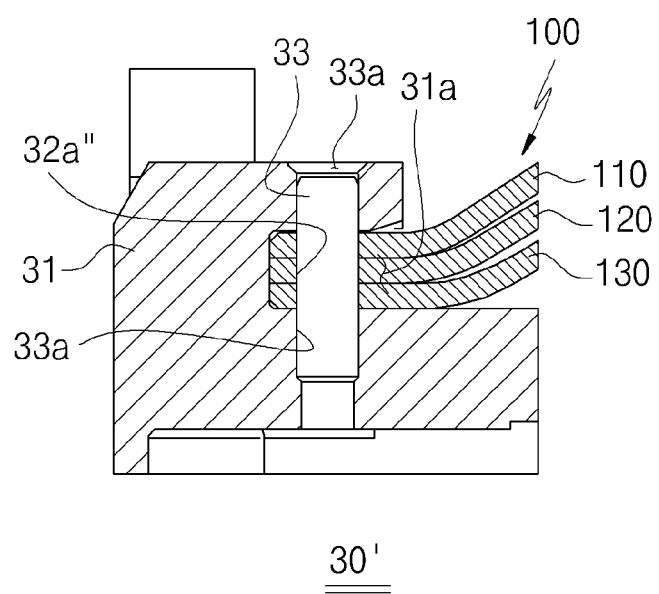

FIG. 4 is a flowchart of the method of manufacturing the top nozzle 30' of FIG. 3. FIGS. 5A and 5B are views showing circular fastening pin holes 33a formed in the spring clamp 31 of the top nozzle 30'. FIG. 5A is a plan view of the spring clamp 31, and FIG. 5B is a sectional view taken along line 5B-5B of FIG. 5A.

Below, the method of manufacturing the top nozzle 30' of FIG. 3 will be explained in detail with reference to FIGS. 3 through 5.

As shown in FIG. 3, to manufacture the top nozzle 30', a main body 30a' is produced in such a way to integrally couple the coupling plate 25 to the perimeter wall 20 having the spring clamps 31 and the fastening parts 15. Preferably, the main body 30a' is formed by casting using a mold which is configured such that the coupling plate 25 is integrated with the perimeter wall 20 having the spring clamps 31 and the fastening parts 15. When the main body 30a' is formed by casting (S10: a casting step, refer to FIG. 4), the spring insert holes 31a can be approximately formed. The casting step S10 of FIG. 4 is only one example selected from various methods of manufacturing the top nozzle 30'. Hence, the main body 30a' of the top nozzle 30' can be manufactured by other well known methods other than the casting step.

At step S20 (forming the fastening pin holes), after the main body 30a' is formed through the casting step S10, the fastening pin holes 33a (refer to FIGS. 5A and 5B) are vertically formed at predetermined positions through the upper surfaces of the spring clamps 31 by drilling or the like.

At step S30 (forming the spring insert holes through an electro-discharge machining process), after the fastening pin holes 33a are formed, an electro-discharge machining process for forming the spring insert holes 31a is conducted. When the electro-discharge machining process is conducted to form each spring insert hole 31a, an electrode having the same shape as that of the end of the hold-down spring unit 100 is used. In this case, the precision of the electro-discharge machining process can be similar to or superior than that of the case of the milling process. Furthermore, in the case of the electro-discharge machining process, the operation of forming spring insert hole 31a is not impeded by the to fastening part 15. Therefore, the spring insert hole 31a can be more precisely formed. Thereby, the stability of the hold-down spring unit 100 fastened to the spring clamp 31 can be markedly enhanced. Various electro-discharge machining methods, for example, a method which was proposed in Korean Patent Laid-open Publication No. 1999-46308 and in which an object is immersed in machining dielectric liquid and then machined, can be used in the electro-discharge machining process of the present invention.

At step S40 of fastening the hold-down spring units 100 to the spring clamps 31, after the spring insert holes 31a are formed at step S30 of forming the spring insert hole by the electro-discharge machining process, as shown in FIGS. 5A and 5B, the end of each hold-down spring unit 100 is inserted into the corresponding spring insert hole 31a. Here, as shown in FIG. 3, the hold-down spring unit 100 includes a first spring 110 having a first neck part 112, a plate spring 120, and a second spring 130. Thereafter, a fastening pin 33 is fitted into each fastening pin hole 33a to fasten the hold-down spring unit 100 to the corresponding spring clamp 31, thus completing the manufacture of the top nozzle 30'. Here, the head of the fastening pin 33, which is fitted into the fastening pin hole 33a, can be processed by spot welding in the same manner as that of the cited reference U.S. Pat. No. 5,213,757.

Figure 7A:
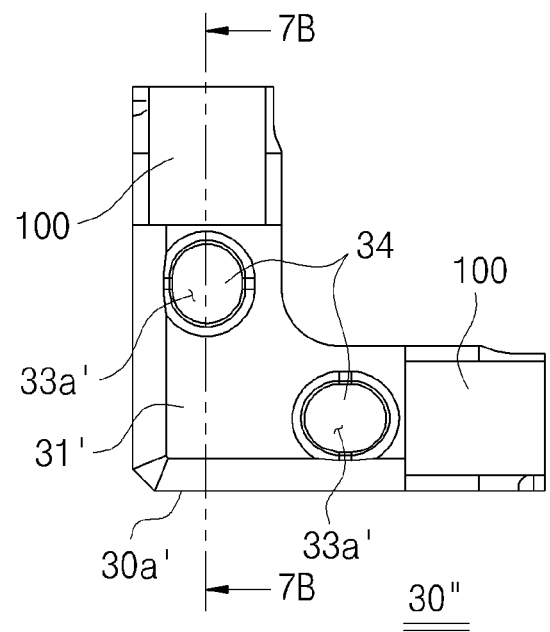
FIGS. 7A and 7B are views showing elliptical pin head seats formed in a spring clamp of the top nozzle manufactured by the method of FIG. 6.
Figure 7B:
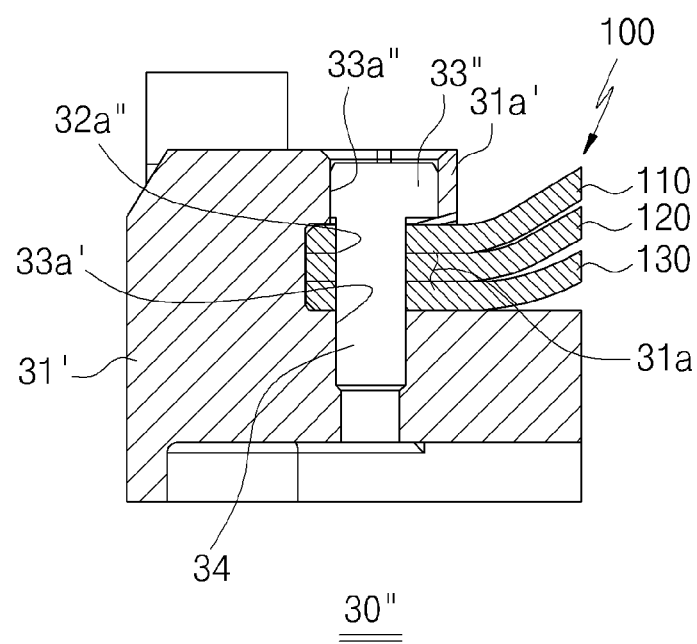

To reduce the stress of the upper surface of the spring clamp 31 attributable to uplift force applied to the hold-down spring unit 100 upwards, the spring clamp 31 can have elliptical pin head seats 33a" each into which an elliptical head 33" of a fastening pin 34 is seated (refer to FIGS. 7A and 7B).

Figure 6:
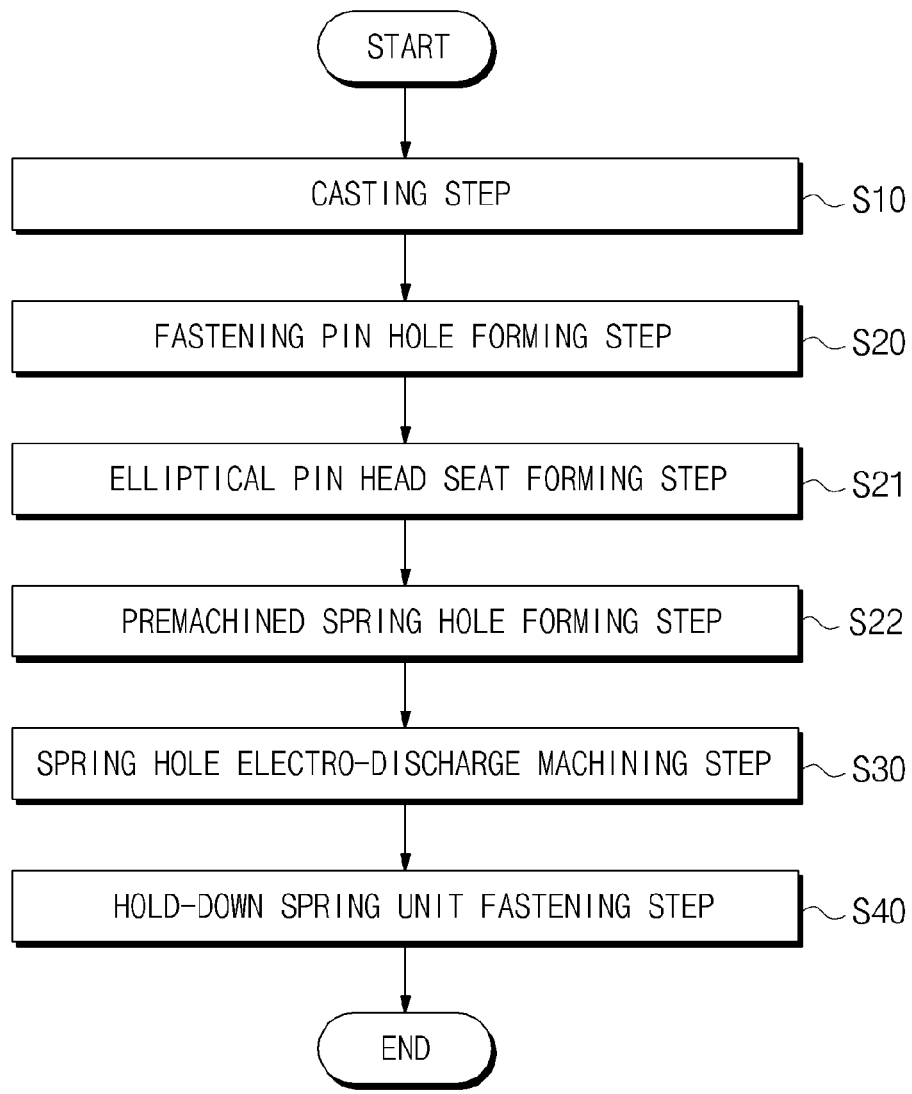
FIG. 6 is a flowchart of a method of manufacturing a top nozzle having elliptical pin head seats into which elliptical heads of elliptical fastening pins are seated, according to another embodiment of the present invention.

FIG. 6 is a flowchart of a method of manufacturing a top nozzle 30" having elliptical pin head seats 33a" into which elliptical heads 33" of elliptical fastening pins 34 (refer to FIG. 7) are seated, according to another embodiment of the present invention. FIGS. 7A and 7B are views showing elliptical pin head seats 33a" formed in a spring clamp 31' of the top nozzle 30" manufactured by the method of FIG. 6. FIG. 7A is a plan view of the spring clamp 31'. FIG. 7B is a sectional view taken along line 7B-7B of FIG. 7A.

The method of FIG. 6 for manufacturing the top nozzle 30" having the elliptical pin head seats 33a" further includes step S21 of forming elliptical pin head seats and step S22 of forming premachined holes as well as including the steps of FIG. 4, that is, the casting step S10, the fastening pin hole forming step S20, the spring insert hole electro-discharge machining step S30 and the hold-down spring unit fastening step S40.

Here, the casting step S10, the fastening pin hole forming step S20, the spring insert hole electro-discharge machining step S30 and the hold-down spring unit fastening step S40 are the same as those of the description of FIGS. 3 through 5, therefore further explanation is deemed unnecessary.

In the method of manufacturing the top nozzle 30" of FIG. 6, a main body 30a' (refer to FIGS. 3, 7A and 7B) is formed by casting (S10) or another well-known method. After the fastening pin holes 33a' (refer to FIGS. 7A and 7B) are formed at the fastening pin hole forming step S20, the elliptical pin head seats 33a" are respectively formed in the upper ends of the fastening pin holes 33a', as shown in FIGS. 7A and 7B. The elliptical pin head seats 33a" are formed in the upper surface 31a' (refer to FIG. 7B) of the spring clamp 31' above the spring insert hole 31a, at the elliptical pin head seat forming step S21.

Thereafter, at the premachined hole forming step S22, to rapidly form each spring insert hole 31a, before the electro-discharge machining process is conducted, a drill tip or milling tip is inserted into the elliptical pin head seat 33a" and then the interior of the spring clamp 31' is machined into the spring insert hole 31a, thus forming a premachined hole (not shown). The "premachined hole" (not shown) means a space which is formed in advance by removing a portion of the body of the spring clamp 31' to form the spring insert hole 31a so as to reduce the time taken to conduct the electro-discharge machining process. The premachined hole can be formed by piercing the body of the spring clamp such that the end of the hold-down spring unit 100 can be inserted thereinto. Alternatively, the premachined hole can be formed in a hollow shape but not pierced.

Subsequently, in the same manner as the description of FIGS. 3 through 5, the spring insert hole electro-discharge machining step S30 and the hold-down spring unit fastening step S40 are consecutively conducted, thus completing the manufacture of the top nozzle 30" having the elliptical pin head seats 33a".

Here, in this embodiment, because the premachined hole forming process S22 is conducted, the volume of a portion to be electro-discharge machined is reduced. Thereby, the spring insert hole electro-discharge machining process S30 can be rapidly conducted.

After the elliptical pin head seats 33a" are formed, the elliptical fastening pins 34 having the elliptical heads 33" are fitted into the corresponding fastening pin holes 33a' and the fastening pin holes 32a" of the relative hold-down spring units 100, thus fastening the hold-down spring units 100 to the spring clamps 31' such that the elliptical heads 33" can directly support the ends of the hold-down spring units 100. Thereby, stress applied to the upper surface 31a' of the spring clamps 31' by the hold-down spring units 100 can be markedly reduced. Therefore, the spring clamps 31' are prevented from being deformed or broken, so that the hold-down spring units 100 can be more stably retained despite being used for a long period of time.

As described above, in the present invention, because spring insert holes are formed by electro-discharge machining in spring clamps provided on a top nozzle, a T-slot for conducting a milling process is not required. Thereby, the structural stability of the spring clamps can be enhanced, thus preventing the spring clamps from being deformed or damaged by ends of hold-down spring units which are inserted into the spring insert holes.

Furthermore, in the present invention, the spring insert holes are precisely formed by the electro-discharge machining such that the ends of the hold-down spring units can be closely fitted into the spring insert holes. The force of supporting the hold-down spring units can be similar to or superior than that of the conventional technique which conducts mechanical machining using the T-slot.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a top nozzle for a nuclear fuel assembly, the method comprising steps of:
   (a) casting a main body of the top nozzle, the main body being integrated into a single body with a coupling plate coupled to a guide thimble and a perimeter wall protruding upwards from a perimeter of the coupling plate;
   (b) forming a fastening pin hole in a vertical direction extending through an upper surface of a spring clamp provided on the top nozzle;
   (c) forming an elliptical pin head seat having a closed elliptical shape inside the upper surface of the spring clamp such that the elliptical pin head seat encloses an upper end portion of the fastening pin hole and, when taken from a plan view, the elliptical pin head seat is entirely enclosed by solid portions of the spring clamp without being open to or exposed to an exterior;
   (d) inserting a drill tip or a milling tip into the elliptical pin head seat and additionally removing an interior portion of the body of the spring clamp by the tip, after the elliptical pin head seat is completed and before forming a spring insert hole, thereby reducing time taken to conduct an electro-discharge machining process;
   (e) forming the spring insert hole by performing the electro-discharge machining process upon the spring clamp in an insert direction of a hold-down spring unit so that the spring insert hole has an upper surface, a lower surface, an outer side surface, an inner side surface and a back surface, with at least the outer side surface and the inner side surface completely closing an outer side and an inner side, respectively, of the spring insert hole;
   (f) coupling an end of the hold-down spring unit into the spring insert hole via a front side thereof;
   (g) providing a fastening pin having an elliptical shaped head, the elliptical shaped head being fitted into the elliptical pin head seat; and
   (h) inserting the fastening pin into the fastening pin hole, wherein the steps (a), (b), (c), (d), (e), (f), (g) and (h) are performed in this order.

2. A method of manufacturing a top nozzle for a nuclear fuel assembly, the method comprising steps of:
   (a) casting a main body of the top nozzle, the main body being integrated into a single body with a coupling plate coupled to a guide thimble and a perimeter wall protruding upwards from a perimeter of the coupling plate;
   (b) forming a fastening pin hole in a vertical direction extending through an upper surface of a spring clamp provided on the top nozzle;
   (c) forming an elliptical pin head seat having a closed elliptical shape in an upper end of the fastening pin hole and inside the upper surface of the spring clamp such that the elliptical pin head seat encloses an upper end portion of the fastening pin hole and, when taken from a plan view, the elliptical pin head seat is entirely enclosed by solid portions of the spring clamp, without being open to or exposed to an exterior;
   (d) inserting a drill tip or a milling tip into the elliptical pin head seat and additionally removing an interior portion of the body of the spring clamp by the tip, after the elliptical pin head seat is completed and before forming a spring insert hole, thereby reducing time taken to conduct an electro-discharge machining process;
   (e) forming the spring insert hole by performing the electro-discharge machining process upon the spring clamp in an insert direction of a hold-down spring unit so that the spring insert hole has an upper surface, a lower surface, an outer side surface, an inner side surface and a back surface, with at least the outer side surface and the inner side surface completely closing an outer side and an inner side, respectively, of the spring insert hole;
   (f) coupling an end of the hold-down spring unit into the spring insert hole via a front side thereof;
   (g) providing a fastening pin having an elliptical shaped head, the elliptical shaped head being fitted into the elliptical pin head seat; and
   (h) inserting the fastening pin into the fastening pin hole, wherein the steps (a), (b), (c), (d), (e), (f) and (g) are performed in this order.

* * * * *